(12) United States Patent
Ishikawa et al.

(10) Patent No.: US 6,436,002 B1
(45) Date of Patent: Aug. 20, 2002

(54) DIFFERENTIAL APPARATUS

(75) Inventors: Yasuhiko Ishikawa; Hideyuki Inose, both of Tochigi (JP)

(73) Assignee: Tochigi Fuji Sangyo Kabushiki Kaisha, Tochigi (JP)

(*) Notice: Subject to any disclaimer, the term of this patent is extended or adjusted under 35 U.S.C. 154(b) by 0 days.

(21) Appl. No.: 09/614,739

(22) Filed: Jul. 12, 2000

(30) Foreign Application Priority Data

Jul. 12, 1999 (JP) ............................. 11-197815
Sep. 21, 1999 (JP) ............................. 11-267660
Apr. 4, 2000 (JP) ............................. 2000-102587

(51) Int. Cl.$^7$ ............................. F16H 48/22
(52) U.S. Cl. ............................. 475/231
(58) Field of Search ............................. 475/231, 150; 74/607

(56) References Cited

U.S. PATENT DOCUMENTS

| | | | | |
|---|---|---|---|---|
| 3,901,103 A | * | 8/1975 | Hufstader | 74/607 |
| 4,612,825 A | * | 9/1986 | Engle | 74/607 |
| 5,092,825 A | * | 3/1992 | Goscenski, Jr. et al. | 475/150 |
| 5,125,876 A | * | 6/1992 | Hirota | 475/231 |
| 5,139,467 A | * | 8/1992 | Carpenter | 475/231 |
| 5,326,333 A | * | 7/1994 | Niizawa et al. | 475/150 |
| 5,951,431 A | * | 9/1999 | Downs et al. | 74/607 |
| 6,254,505 B1 | * | 7/2001 | Forrest | 475/231 |

FOREIGN PATENT DOCUMENTS

| | | |
|---|---|---|
| JP | 63-97425 | 4/1988 |
| JP | 63-195449 | 8/1988 |
| JP | 6-12857 | 2/1994 |
| JP | 6-144040 | 5/1994 |
| JP | 7-305754 | 11/1995 |

OTHER PUBLICATIONS

"Eaton Electronically Controlled Limited Slip," *Eaton Corporation*, Feb. 1991.

* cited by examiner

*Primary Examiner*—Sherry Estremsky
(74) *Attorney, Agent, or Firm*—Morrison & Foerster LLP

(57) ABSTRACT

A differential case has therein a bevel gear type differential mechanism, difference limiting main and pilot clutches, and a cam mechanism for increasing engagement force of the pilot clutch to be transmitted via a transmission member for actuation of the main clutch. Vehicular axles inserted in the differential cases are connected to torque-outputting side gears with circlips for removal prevention thereof and a thrust block to fill a space therebetween. The circlips and the thrust block are applied from the outside through apertures formed in the differential case and the transmission member.

16 Claims, 10 Drawing Sheets

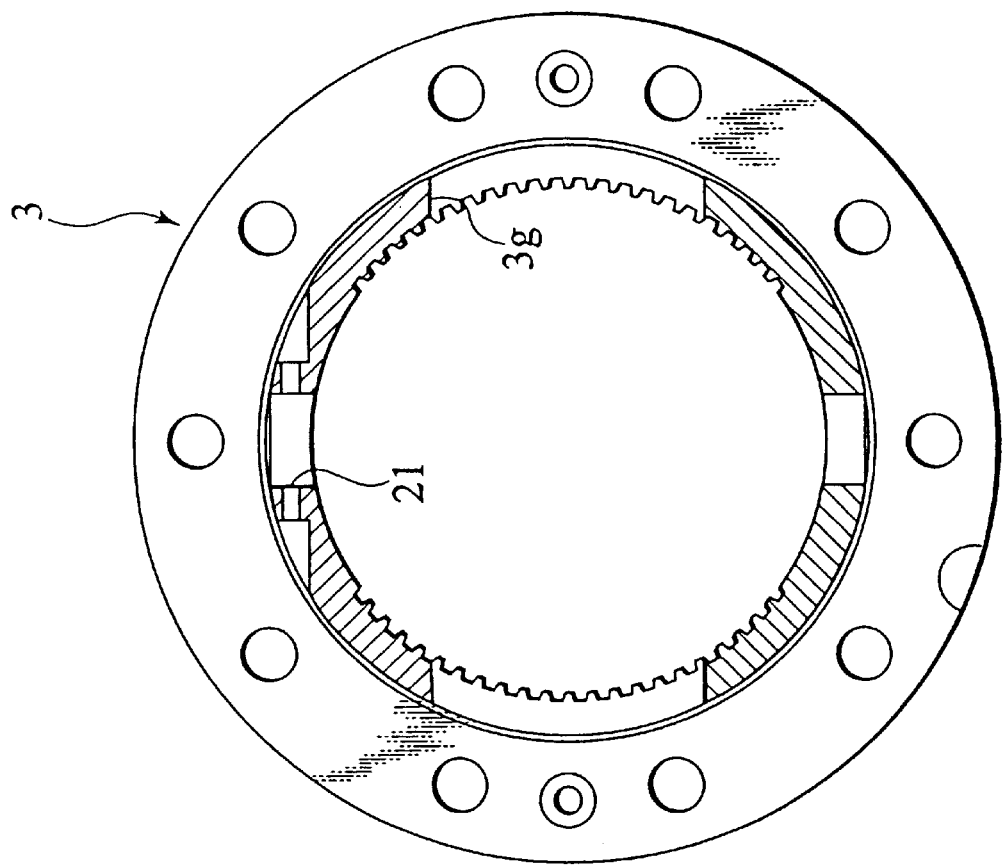
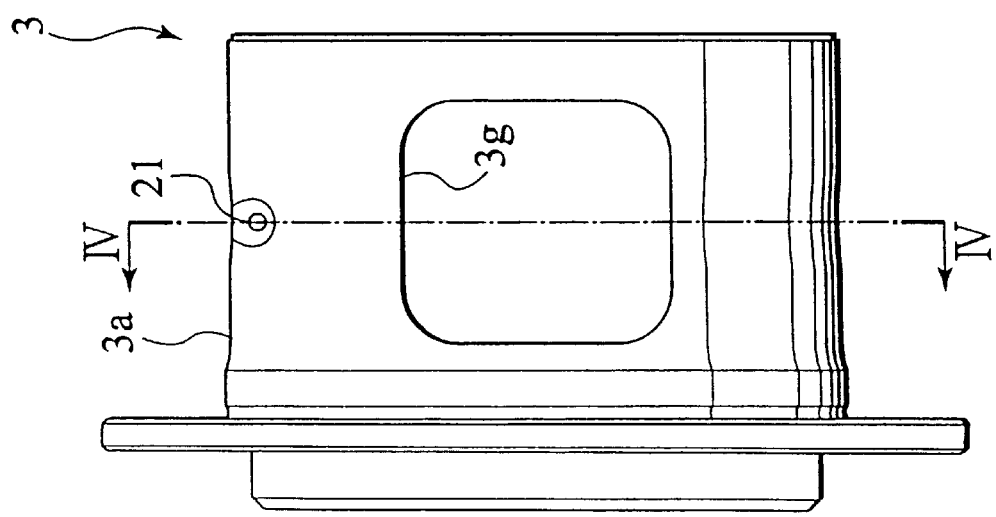

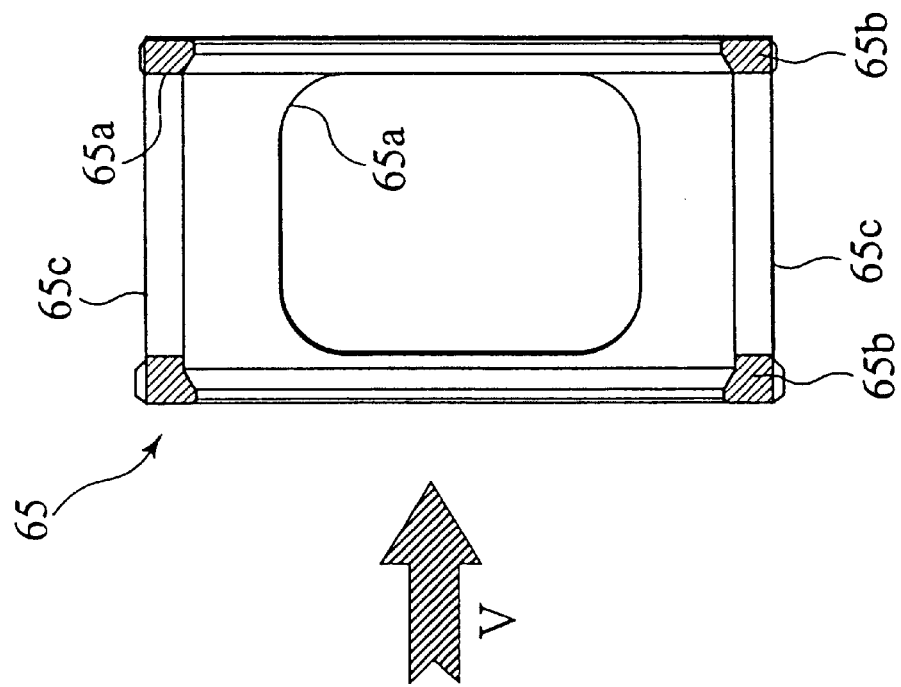
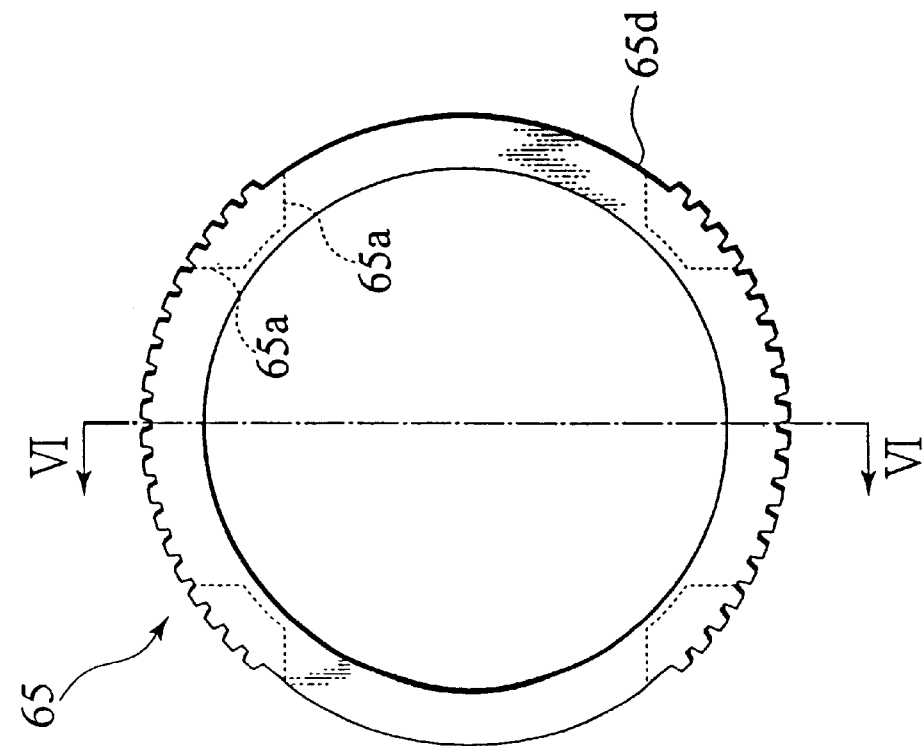

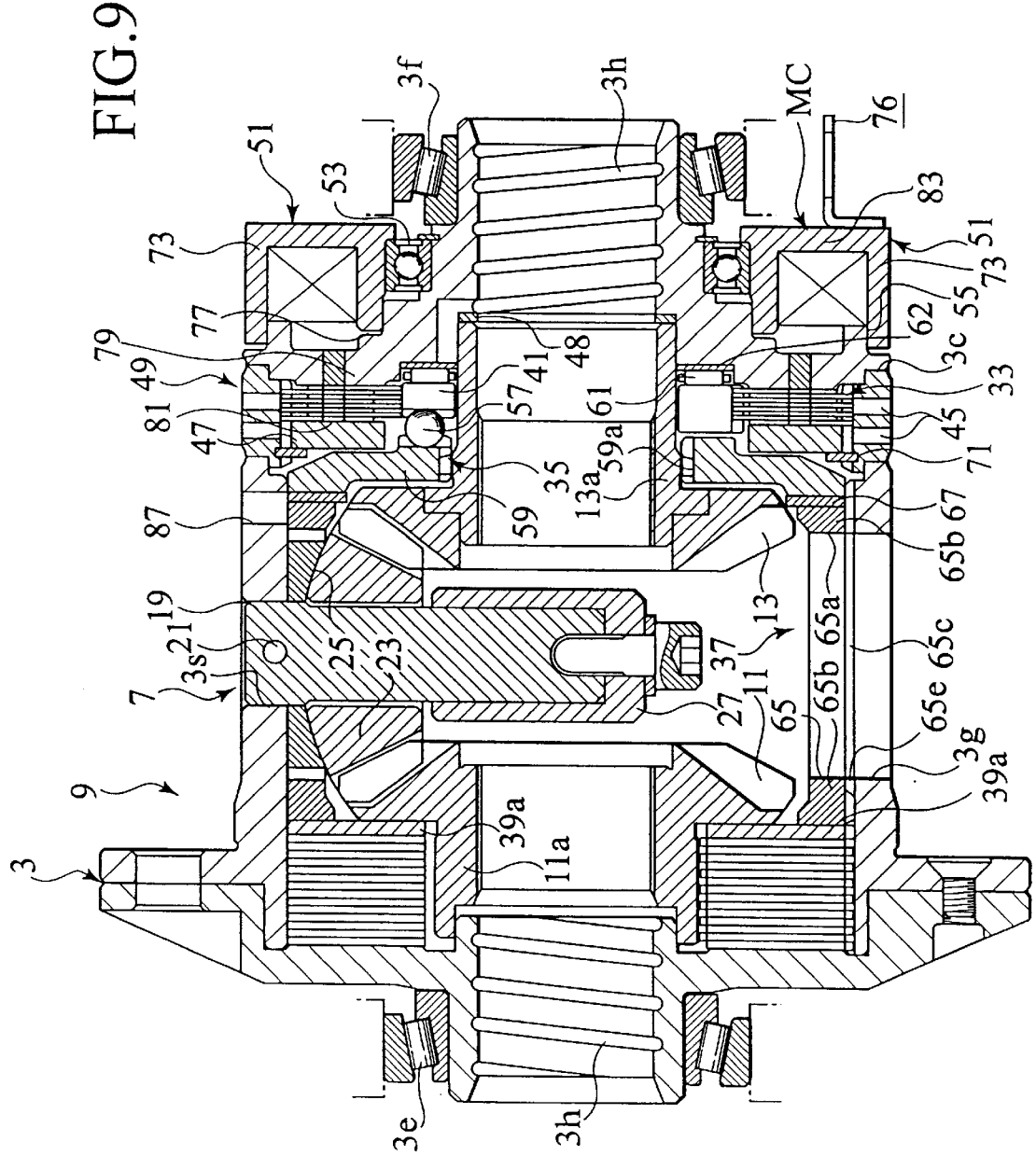

DIFFERENTIAL APPARATUS

BACKGROUND OF THE INVENTION

1. Field of the Invention

The present invention relates to a differential apparatus for vehicles.

2. Related Art

A differential apparatus for vehicles having a bevel gear differential mechanism is disclosed in the Japanese Patent Application Laid-Open Publications No. 6-144040 and 7-305754.

These differential apparatuses include an input member to which rotational drive power is input from outside the apparatus, output gears outputting rotational drive power outside the apparatus, a bevel gear that permits the output gears to differentially rotate while meshing therewith, so as to distribute rotational drive power from the input member to the output gears, and a difference limiter controlling the difference between the output gears, wherein an actuation member is provided for switching the difference limiter on an off.

The input member is formed in the shape of a container, in which are housed and supported the output gears, the bevel gear, and the difference limiter and a driving member therefor, and end parts of axles are inserted thereinto and joined to corresponding axle engaging parts of the output gears. The insertion length of each axle is dependent on the vehicle specifications, and a change in a basic model of the input member serving as a container bearing member acts to drive up the cost.

Given the above, one approach is to separate the difference limiting mechanism, providing a plurality of difference limiting parts, and to adjust the arrangement of the output gears and the bevel gear along the axial direction of the axle, so as to enable sharing of a container model.

This makes it necessary to limit an increase in the number of component parts and the weight of the apparatus.

SUMMARY OF THE INVENTION

Accordingly, it is an object of the present invention to provide a differential apparatus for vehicles, wherein when arrangement of a plurality of difference limiters, output gears, and a bevel gear in the axial direction of a vehicle axle is done to achieve sharing of a container model, it is possible to effectively limit an increase in the number of component parts and the weight of the apparatus.

An aspect of the present invention that achieves this object is a differential apparatus including an input member having a first supporting part and a second supporting part mutually spaced apart and joined at a container wall part, a first output gear and a second output gear housed within the input member, a first difference limiter and a second difference limiter interposed between the first output gear and the first supporting part and between the second output gear and the second supporting part, respectively, a drive member that operatively links the first and second difference limiters, and an access path to an axle engaging part of at least one of the first and second output gears, provided through the drive member and the container wall part of the input member.

According to this aspect, sharing of the drive member reduces the number of parts, and the opening up of the access path reduces the weight of the apparatus. A part of the apparatus that includes the first supporting part, the first output gear, and the first difference limiter, and another part of the apparatus that includes the second supporting part, the second output gear and the second difference limiter can be disposed separately, with the bevel gear in between, so that a part of the apparatus including the drive member and container wall part of the input member can be extended between those parts of the apparatus for the provision of an access path. It therefore is possible, without changing a basic model of the input member, to adjust dimensions for each part of the apparatus, thereby achieving a high degree of design flexibility, and freedom of selection of additional functions. Furthermore, because of the existence of the access path, ease of assembly is improved. Additionally, because there is little restriction with regard to the direction of transmission of forces of the various parts of the apparatus, it is possible to establish an appropriate transmission direction which, used in combination with an appropriate added function, enables effective distribution of torque.

BRIEF DESCRIPTION OF THE DRAWINGS

The above and additional objects, features, functions and advantages of the present invention will more fully appear when the following detailed description of the preferred embodiments are read in conjunction with the accompanying drawings, in which:

FIG. 3 is a side elevation of a differential case serving as an input member of the differential apparatus of FIG. 2;

FIG. 4 is an IV—IV cross-sectional view of the differential case of FIG. 3;

FIG. 5 is an illustration showing a pressure ring serving as a drive member of a difference limiter of the differential apparatus of FIG. 2;

FIG. 6 is a VI—VI cross-sectional view of the pressure ring of FIG. 5;

FIG. 9 is a cross-sectional view of a variation of a differential apparatus according to the embodiment of the present invention of FIG. 2;

DETAILED DESCRIPTION OF THE PREFERRED EMBODIMENT

Embodiments of the present invention are described in detail below.

Firstly, an embodiment is described with references made to FIG. 1 through FIG. 8B.

Figure 1:
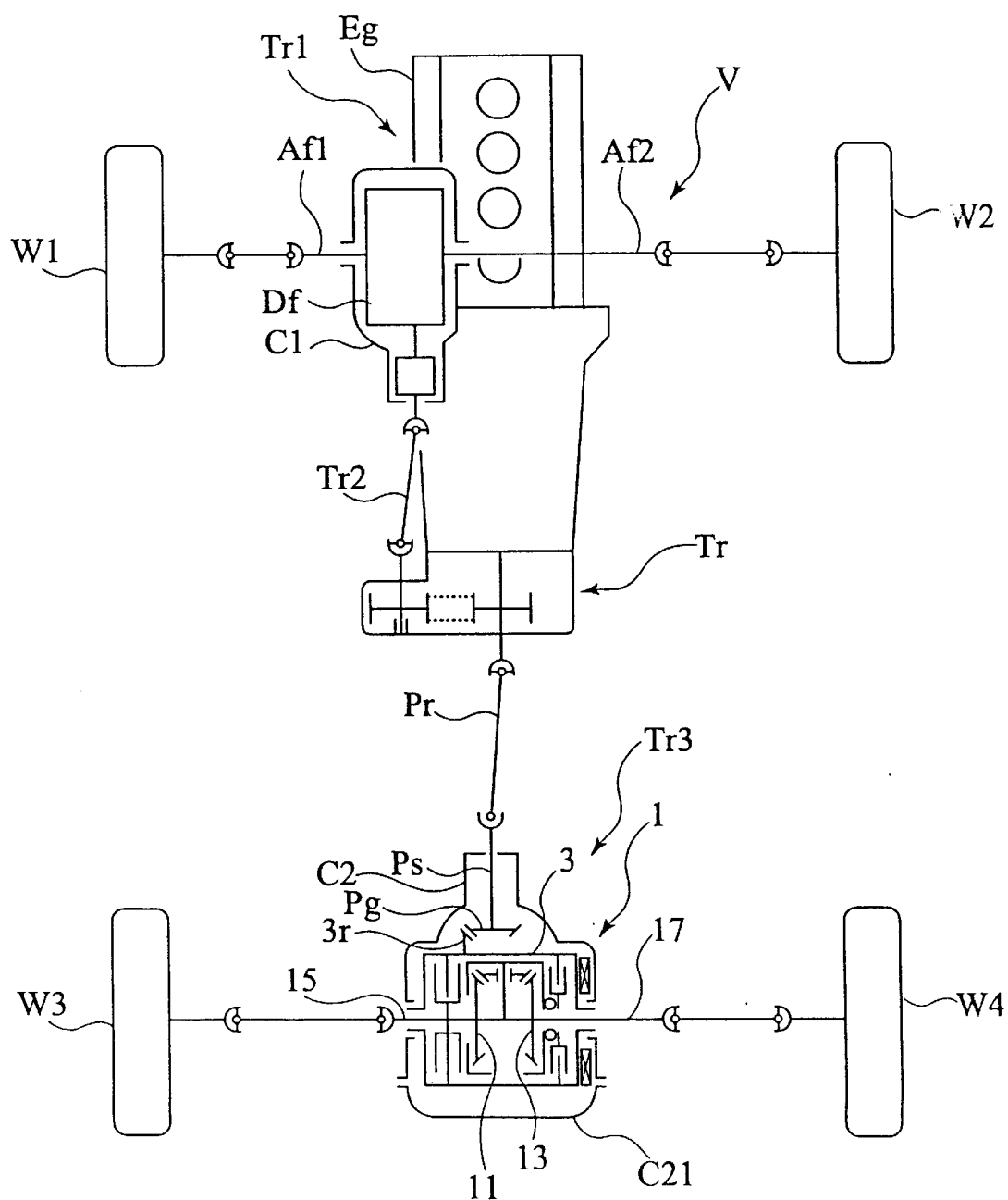
FIG. 1 is a skeleton view of a vehicle into which is fitted a differential apparatus according to an embodiment of the present invention.

FIG. 1 is a skeleton view of a vehicle V into which is fitted a differential apparatus 1 according to an embodiment of the present invention.

The vehicle V has left and right front wheels W1 and W2, to which drive power from an engine Eg is imparted independently, and a power train Tr, which distributes drive power to left and right rear wheels W3 and W4, this power train Tr having a return train Tr2 transmitting drive power extracted to an output shaft of a transmission from the vertical-oriented engine Eg via a chain and a drive shaft, branching the drive power to a viscous coupling within a front differential carrier C1, a front train Tr1 transmitting drive power received by the viscous coupling to the left and right front wheels W1 and W2,via a front differential Df and front axles Af1 and Af2, and a rear train Tr3 transmitting drive power of the transmission output shaft from a propeller shaft Pr to the differential apparatus 1 within a differential carrier C2 and to the left and right rear wheels W3 and W4 via rear axles 15 and 17. A ring gear 3r is fixed to a differential case 3 of the differential apparatus 1, this ring gear 3r meshing with a drive pinion gear Pg, the drive pinion gear Pg being formed on a drive pinion shaft Ps, and the drive pinion shaft Ps being linked to the propeller shaft Pr.

Figure 2:
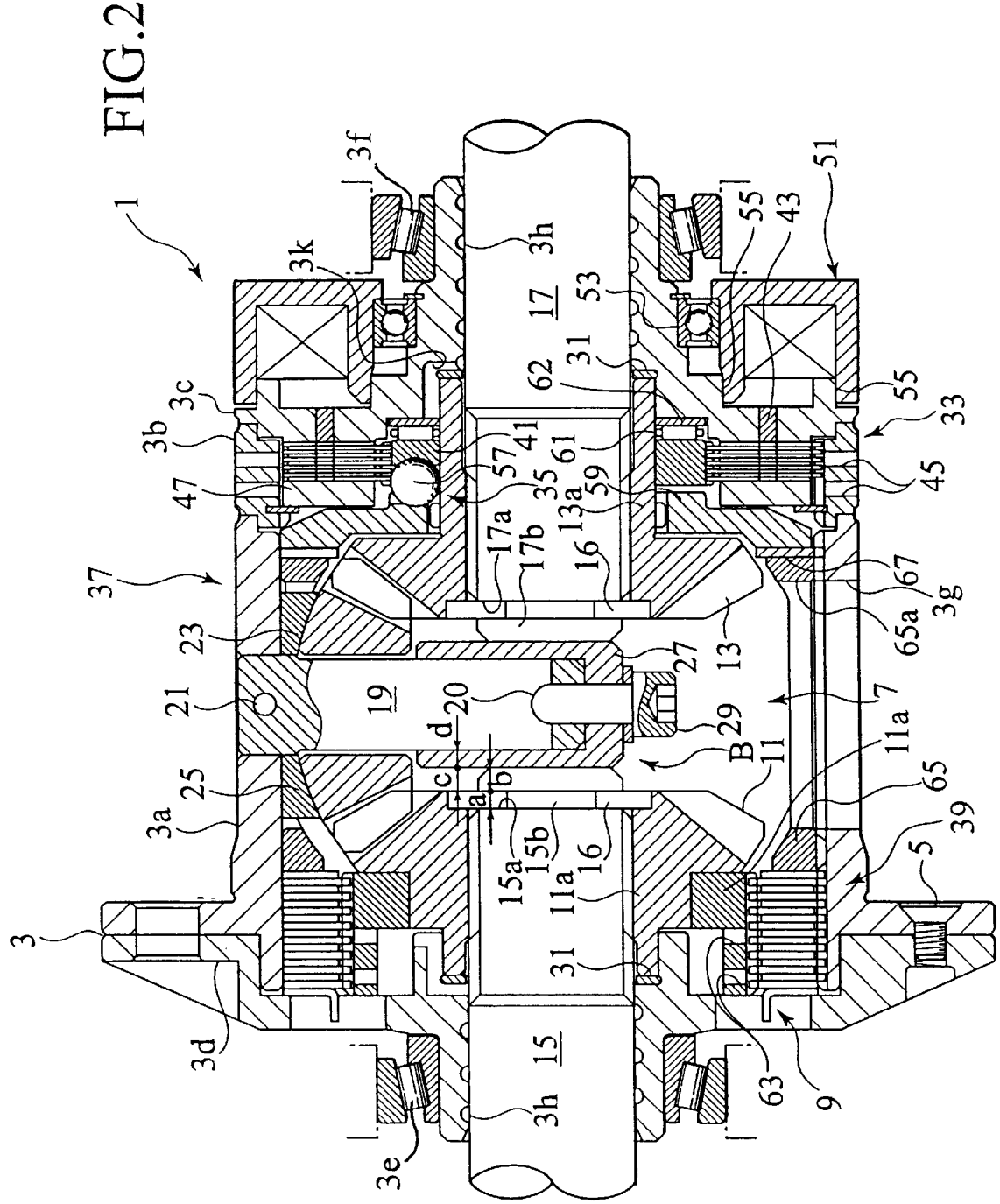
FIG. 2 is a cross-sectional view of the differential apparatus of FIG. 1.

As shown in FIG. 2 to FIG. 4, a differential case 3 of a differential apparatus 1 of this embodiment is formed by a differential case 3a wherein a cylindrical part 3b and a wall part 3c are joined, and a cover 3d, which are joined together by bolts 5. The differential case 3 is rotatably supported on a differential carrier C2 having a cover C21, shown in FIG. 1, by shafts 3e and 3f at both sides. The inside of the differential carrier is filled with a prescribed amount of lubrication oil, and lubricated by an oil sump. Motive power from the engine Eg is input to the differential case 3, and passes through a bevel gear differential mechanism 7, described below, being distributed to the left and right by the output side gears 11 and 13 on the left and right, so as to be output to the left and right rear axles. When the left and right rear axles are differentially rotated, the difference limiter 9 operates under electromagnetic control so as to limit the differential action.

The configuration of the differential mechanism 7 and the method of assembling its main elements are as follows.

As shown in FIG. 2, a pinion shaft 19 perpendicular to the rotational axis of the differential case 3 is fixed to the differential case 3, and held in place by a pin (depicted as a pin insertion hole) 21, which holds it as one with the differential case 3. A threaded hole 20 is formed perpendicular to the longitudinal direction of the pinion shaft 19 on the inside end thereof. An aperture 3g is formed in a peripheral wall of the differential case 3 on an extension of the threaded hole 20.

A pinion gear 23 is rotatably supported above the pinion shaft 19, and meshes with the output side gears 11 and 13. A thrust washer 25, which receives thrust of the pinion gear 23, is disposed at the rear side of the pinion gear 23. The side gears 11 and 13 are disposed in mutual opposition, so that a space between the opposing end faces thereof sandwiches the pinion shaft 19 disposed therebetween.

Figure 7A:
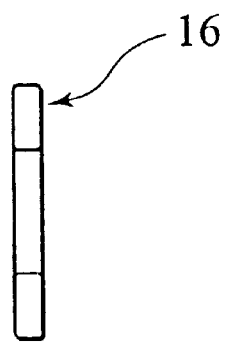
FIG. 7A is a front elevation of a circlip of the differential apparatus of FIG. 2.
Figure 7B:
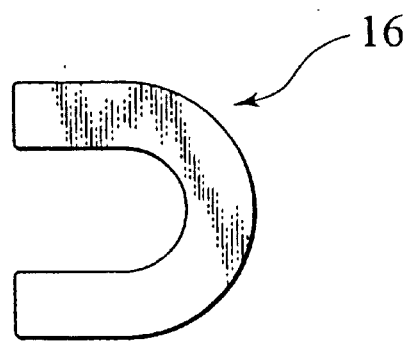
FIG. 7B is a side elevation of the circlip of FIG. 7A.

Left and right rear axles 15 and 19 are inserted into the hollow shaft parts 11a and 13a of the side gears 11 and 13 from the outside and linked thereto by a spline linkage. Peripheral grooves 15a and 17a are provided on opposing ends 15b, 17b of the rear axles 15 and 17. Bosses 3e and 3f are formed on both ends of the differential case 3 in the axial direction are supported on the differential carrier C2 by an angular contact bearing. When the rear axles 15 and 17 are assembled, an opposing end is first inserted inward, so that the peripheral grooves 15a and 17a can be visually verified from the aperture 3g of the differential case 3, and then a U-shaped circlip (retaining clip) 16 is fitted into the peripheral grooves 15a and 17a, thereby preventing removal of the rear axles 15 and 17 toward the outside. FIG. 7A and FIG. 7B are a front elevation and side elevation, respectively, of the circlip 16.

Figure 8A:
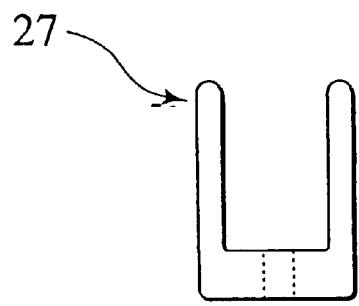
FIG. 8A is a front elevation of a thrust block of the differential apparatus of FIG. 2.
Figure 8B:
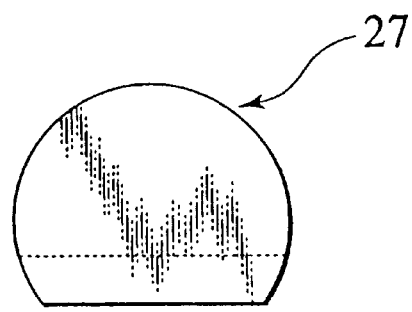
FIG. 8B is a side elevation of the thrust block of FIG. 8A.

Next, in the same manner, the thrust block (block member) 27 having a channel-shaped cross-section as shown in FIG. 8A and FIG. 8B is fitted around the outside at the threaded hole 20 of the pinion shaft 19, from the aperture 3g of the differential case 3, and a mounting tool is inserted to hold this in place with a bolt, thereby stopping movement of the pinion shaft 19 outward (refer to B shown in FIG. 2). Thus, the space between the pinion shaft 19 and the opposing ends of the rear axles 15 and 17 is filled, the outer surface of the thrust block 27 coming into sliding contact with the opposing end parts of the rear axles 15 and 17.

The pinion shaft 19 the thrust block 27, and the bolt 29 below the single-dot-dashed line at part B of FIG. 2 are shown in cross-sectional view form perpendicular with respect to the upper drawing. FIG. 8A shows the thrust block 27, with FIG. 8B being a view in the direction of arrow A shown in FIG. 8A.

It will be understood that the retaining means preventing pullout outward with respect to the rear axles 15 and 17 is not limited to the circlip 16, and can alternately be, for example, a pin.

In consideration of the bolt 29 not to be loosened relative to the pinion shaft 19, there may preferably be adopted countermeasures such as applying an adhesive agent between the bolt 29 and the screw hole 20, or substituting the bolt 29 itself with a stud bolt to be fixed to the shaft 19, to be secured with an anti-loosening nut after insertion of the thrust block 27 from outside. Further, the thrust block 27 may preferably be set in position relative to the differential case body 3d.

It is possible to achieve the object of the present invention of improvement of assembly easy by establishing the axial-direction dimensions of various constituent members so as to improve ease of assembly as follows, regardless of the shape and dimensions of the thrust block 27, peripheral grooves 15a and 17a formed on the rear axles 15 and 17, or the opposing ends 15b and 17b of the rear axles 15 and 17.

First, the axial-direction dimensions a, b, c, and d of the related parts are established as follows. Specifically, as shown in FIG. 1, the thickness of the circlip 16 is established with respect to the outer end surfaces of the opposing end 15b and 17b (inner end surfaces of the peripheral grooves 15a and 17a) as a reference is taken as the dimension "a". The axial-direction length of the opposing ends 15b and 17b is taken as "b".

Next, the length from the inner end surfaces of the side gears 11 and 13 after assembly of the differential apparatus to the outer end part of the thrust block 27 is taken as "c". The thickness from the outer end of the thrust block 27 to the inner peripheral end (equal in this embodiment to the length up to the outer peripheral end of the pinion shaft 19) is taken as "d".

Given the above, if $c+d \geq a+b$, it is possible to assemble the circlip 16 to the rear axles 15 and 17 without the pinion shaft 19 pulling out from the differential case 3, and as long as this relationship is satisfied, a problem does not arise, regardless of the shapes of the circlip 16 and the thrust block 27, thereby improving the ease of assembly.

Although in FIG. 2, symbols were applied to the rear axle 15 side for the above description, if the symmetry of the rear axle 17 omitted from the drawing with respect to the pinion shaft 19, applicability of the above-noted description can be understood to apply to the rear axle 17 as well.

The thickness (dimension) and shape of the thrust block 27 and the circlip 16 need not be symmetrical left-to-right.

Thrust washers 31 are disposed between the outer end surfaces of the hollow shaft parts 11a and 13a of the side gears 11 and 13 and the differential case 3, so as to receive the thrust of the side gears 11 and 13. A helical groove 3h is formed on the inner periphery of the shaft parts 3e and 3f on both ends of the differential case 3, neighboring the part at which the thrust washers 25 are disposed, and an oil path 3k is formed so as to communicate therewith.

The difference limiter 9 mainly comprises a multi-plate pilot clutch 33, a cam mechanism 35, a pressure member sub-unit 37 and a multi-plate main clutch 39.

The pilot clutch 33 and the main clutch 39 are disposed, as shown in the drawing, between the rear surfaces of the side gears 11 and 13 on each side and each of the end walls of the differential case 3. The pilot clutch 33 is disposed between the inner periphery of the differential case 3, the outer periphery of a cam ring 41, to be described below, rotatably and movably supported on the shaft of the right side gear 13. The element shown as 43 and the cylindrical part 3b of the differential case 3 are non-magnetic materials. The part of the cylindrical part 3b opposite the pilot clutch 33 is provided with a plurality of oil paths 45. An armature 47 is disposed adjacently to the left side of the clutch plates of the pilot clutch 33.

An electromagnet 51 that disengages the pilot clutch 33 is disposed adjacent to and outside of the right end wall 3c of the differential case 3, and fixed to the differential case C2 of FIG. 1. A bearing 53 is disposed between the electromagnet 51 and the differential case 3, by which radial direction positioning of the differential case 3 and the electromagnet 51 are performed, and gaps 55 are maintained as a prescribed value.

The cam mechanism 35 mainly comprises the above-described cam ring 41, and a pressure plate 59 and thrust bearing 61 which are in opposition so as to sandwich the ball 57 therebetween. The pressure plate 59 can engage the right side gear 13 in the rotational direction, and can move in the axial direction. A cam is formed on each of the opposing surfaces of the cam ring 41 and the pressure plate 59. When the pilot clutch 33 is engaged, with relative rotation between the cams (between the differential case 3 and the side gear 13), there occurs a cam action, so that torque is converted to a thrusting force and magnified.

The multi-plate main shaft 39 is disposed between the inner periphery of the differential case 3 and a hub 11a that is integrally formed with the left side gear 11. The hub 11a is provided with oil paths 63 in a radial pattern. The clutches 33 and 39 are disposed on both sides of the differential mechanism 7 so as to surround it.

Lubricant passes through oil paths 3k, and is supplied via oil paths 63 over respective sliding surfaces of clutch plates of the main clutch.

A pressure member sub-unit 37 is constituted by the pressure plate 59 that receives the above-noted thrust of the cam mechanism 35, a cylindrical transmission member 65 transmitting the pressure from the pressure plate 59 to the main clutch 39, and a thrust washer 67 inserted between the transmission member 65 and the pressure plate 59. The transmission member 65, as shown in FIG. 5 and FIG. 6, is provided with four apertures 65a having the same dimension as the differential case 3 aperture 3g, and has an annular part 65b, an arm part 65c, and a cutout tooth part 65d.

Focusing on the assembly ease for the elements surrounding the differential apparatus 1, in positioning the left and right rear axles 15 and 17, by merely first removing the thrust block 27, it is possible to insert the circlip 16 from the aperture 3g of the differential case 3 and attach it to the peripheral grooves 15a and 17a of the rear axles 15 and 17, without the need to remove the pinion shaft 19, thereby greatly improving the ease of assembling the rear axles 15 and 17, and greatly reducing the manufacturing cost.

Without the need to remove the pinion shaft 19 when mounting the circlip 16, it is possible to offset the position of the pinion shaft 19 to the left in FIG. 1.

A differential apparatus for a vehicle according to the present invention has a differential case rotationally drive by motive power from an engine, a bevel gear type differential mechanism disposed within the differential mechanism, a pullout preventing member mounting to the opposing end parts of the each output shaft linked to opposing output side gears, a block member filling a space between the opposing end parts, fixed to a pinion shaft disposed between opposing end parts of the output shafts, and an aperture for mounting the removal preventing member and block member, provided in the differential case.

Therefore, by using the aperture of the differential case to mount the removal preventing member, removal of the output shafts toward the outside is prevented, and by fixing the block member to the pinion shaft and filling the space, movement of the output shafts toward the inside is prevented, thereby reliably establishing the position of the output shafts.

According to this embodiment, the block member is fixed to the pinion shaft after mounting the removal preventing member to the opposing end parts of the output shafts.

Thus, before fixing the block member to the pinion shaft, the opposing ends of the output shafts are moved toward the inside, enabling mounting of the removal preventing members to the output gears, thereby facilitating mounting of the output shafts.

According to this embodiment, the block member is formed so as to have a channel-shaped cross-section, and be fitted around the outside of the pinion shaft.

With the block member fitted around the outside of the pinion shaft, it is easy to prevent movement of the output shafts toward the outside.

Additionally, a differential for a vehicle according to this embodiment has a differential case rotationally driven by drive power from an engine, a bevel gear type differential mechanism housed in the differential case, and a main and electromagnetic clutch that limit the differential operation of the differential mechanism, the main clutch engaging in response to the engagement of the electromagnetic clutch, and the differential mechanism being disposed between the main clutch and the electromagnetic clutch.

Therefore, in contrast to an example of the past, in which the difference limiter is centralized at one side of the differential mechanism, the clutches are separated and disposed so as to surround the differential mechanism, making it possible to make the lengths of the left and right axles, for example, linked to the differential apparatus at the output side thereof the same length, enabling sharing of components. For example, the distances from the shaft center position of the pinion shaft 19 shown in FIG. 1 to the left and right bosses 3e and 3f of the differential case 3 become equal. Even in the case of a structure suspended from the vehicle, the distances from the shaft center of the pinion shaft 19 to the vehicle side mounting surfaces of the left and right axles are equal.

According to this embodiment, the cam mechanism that increasing the engaging force of the electromagnetic clutch and causes the main clutch to engage is disposed in an outer peripheral part of the differential mechanism.

With the cam mechanism disposed in an outer peripheral part of the differential mechanism, it is possible to reduce the size of the differential apparatus in the axial direction.

While the foregoing embodiment is described for the case in which a pinion shaft rotatably supporting a pinion-gear of the differential mechanism can move in the rotational direction of the differential case, and the main clutch and electromagnetic clutch are multi-plate clutches, it is alternately possible to use a cam mechanism having a cylindrically shaped member engaged with the outer periphery of an outside clutch plate of the electromagnetic clutch that can rotate relative to the differential case and cams provided on the parts opposing the pinion shaft.

In this case, it is possible to simplify the parts that constitute the cam mechanism, thereby providing an advantage in terms of cost.

It is also possible to have multi-plate main and electromagnetic clutches, and a cam mechanism having a cylindrically shaped member engaged with the outer periphery of an outside clutch plate of the electromagnetic clutch and cams provided on the parts opposing a pressure member of the main clutch.

In this case, a further simplification of the parts constituting the cam mechanism is possible.

It is further possible to have a cam mechanism formed by a pressure member of the main clutch and cams provided on the parts opposing the differential case.

In this case, it is possible to simplify the parts that constitute the cam mechanism.

It will be seen that in the vehicle suspension system, left and right output shafts can have an equal length to each other, as a significant advantage.

Next, a variation of the embodiment of FIG. 2, this being a rear train differential 100 (hereinafter referred to as a rear differential) is described below, with references being made to FIG. 9 to FIG. 13. The differential apparatus 100 has substantially the same configuration as the already-described differential apparatus 1, and corresponding constituent elements thereof are assigned the same reference numerals and will not be explicitly described herein.

The pinion shafts 19 are disposed in a radial pattern, the inner ends of which are mutually linked by a thrust block 27, and the outer ends of which are fitted into a through hole 3s of the differential case 3 and held in place with a spring pin 21.

The pinion gears 23 are pivotally supported on the pinion shafts 19, the side gears 11 and 13. meshing from the left and right with the pinion gears 23. A washer 24 with a spherical surface is disposed between each pinion gear 23 and the differential case 3, these receiving the distributed force in the input shaft direction (upward in the drawing) of the force of repulsion caused by centrifugal force of the pinion gears 23 and the meshing thereof with the side gears 11 and 13.

The left and right rear axles pass through the differential case 3 and are spline-linked to the side gears 11 and 13 from the bosses 3e and 3f, respectively.

The drive force of engine which rotates the differential case 3 is distributed from the pinion shafts 19, the pinion gears 23, and the side gears 11 and 13 to the rear axles, and then to the rear wheels of the vehicle.

When a drive resistance difference occurs, such as when traveling over a bad road surface, if the limiting mechanism of the difference limiter 9 is disengaged, as noted below, rotation of the pinion gears 23 causes differential distribution of drive power from the engine to the left and right rear wheels.

The main clutch 39 of the difference limiter 9 is disposed between the outer periphery of a boss 11a formed on the left side gear 11 and the inner periphery of the differential case 3. A washer 39a is disposed on the right side of the main clutch 39, and this washer 39a can be replaced by one having a different thickness, so as to provide appropriate adjustment of the spacing being the clutch plates of the main clutch 39.

The cam force of the left side gear 13 occurring because of the meshing with the pinion gears 23 is input to the main clutch via the washer 39a.

The above-noted cam force is the force component in the thrust direction generated by meshing between the pinion gears 23 serving as the input gears and the side gears 11 and 13. That is, the meshing force angle at the bevel gear is the cam angle, enabling the achievement of an extremely high cam force.

The cam force of the right side gear 13 is input to the differential case 3 via the thrust washer 48 and stops thereat.

A ring 49 made of stainless steel (a non-magnetic material) is welded to the right end of a cylindrical part of the differential case 3, and to this ring 49 is welded the wall part 3c, which is a rotor made of a magnetic material, which is integral with the right boss 3f.

The pilot clutch 33 is disposed between the ring 49 and the cam ring 41.

The cam ball 57 is formed between the cam ring 41 and the pressure plate 59, and a thrust bearing 61 and washer 55 that receive the cam repulsive force of the cam ball are disposed between the cam ring 41 and the rotor part 3c.

The pressure plate 59 is movably linked at the boss 59a to the right side gear 13, via a spline.

The intermediate pressure member 65 is formed as a transmission member by a left annular part 65b disposed in opposition to the main clutch 39 (washer 39a), a right annular part 65b disposed in opposition to the pressure plate 59 via the thrust washer 67, and an arm part 65c linking the rings 65b and passing between the pinion shafts 19. The intermediate pressure member 65 is linked movably in the axial direction to the inner periphery of the differential case 3 by the spline 65e at the annular parts 65b, and transmits the pressing force for the pressure plate 59 to the main clutch 9.

By using the intermediate pressure member 65, the main clutch 39 can be disposed on the opposite side of the differential mechanism 9 from the other group of members (pilot clutch 33, cam ball 57, cam ring 41, pressure plate 59, armature 47, and electromagnet 51 and the like),that form the difference limiter 9.

By disposing the constituent elements of the difference limiter 9 on both sides of the differential mechanism 7 in the axial direction, weight and dimensional balance are achieved in the axial direction.

The armature 47 is disposed so as to be movable in the axial direction between the pilot clutch 33 and the pressure plate 59, and is positioned by a snap ring 71.

The core 73 of the electromagnet 51 is pivotally supported on the boss 3f of the differential case 3 by a ball bearing 53, and is linked to the differential case 3 via a bracket 76 serving as a linking member, and prevented from rotating.

The boss 3f is integrally formed with the wall part 3c serving as a rotor, and the wall part 3c serves as part of the magnetic circuit of the electromagnet 51. The ring 49 prevents leakage of magnetic flux toward the left side of the differential case 3, and causes the magnetic flux to concentrate on the armature 47.

An air gap 77 is formed between the core 73 and the wall part 3c. The wall part 3c is divided in the radial direction by a ring 79 made of stainless steel, and cutouts 81 are provided spaced uniformly in the circumferential direction on each clutch plate of the pilot clutch 33. The ring 79 and cutouts 81 prevent shorting of the magnetic circuit MC.

If the controller detects driving through a turn by means of vehicle speed, steering wheel angle, and lateral G forces, or in response to the road surface condition, vehicle starting, and acceleration or the like, it performs excitation, control of the excitation current of, or stoppage of excitation of the electromagnet 51, thereby adjusting the differential limiting force of the difference limiter 9 (between the rear wheels).

When the electromagnet 51 is excited, a magnetic force loop 83 is formed, pulling the armature 47 to the right, and applying pressure to the pilot clutch 33 so as to engage it.

When the pilot clutch 33 is engaged, differential torque is applied to the cam ball 57 via the cam ring 41 linked to the differential case 3 via the pilot clutch 33 and the pressure plate 59 on the side gear 13 side, the generated cam thrust force is received, and the pressure plate 59 moves toward the left, the main clutch 39 being pressed via the thrust washer 67 and the intermediate pressure member 65 so as to engage.

With the main clutch 39 engaged, the frictional force thereof limits the differential rotation of the differential mechanism 7, the difference limiting force causing limiting of the differential rotation (free rotation) between the rear wheels, thereby greatly improving the drivability over poor road surfaces, starting, acceleration, and stability.

With the rear differential 100, the configuration is such that the cam force due to the meshing of the side gear 11 is input to the main clutch 39.

As noted above, by disposing the main clutch 39 to the opposite side of the differential mechanism 7 from the ball cam (41+57+59) that is, the direction of operation of the cam force of the side gear 11, the cam force of the side gear 11 and the cam thrust force of the ball cam act in the same direction.

Additionally, with the bevel gear type differential mechanism 7, it is possible to achieve a large cam force with a side gear 11 such as described above.

Thus, the pressing force of the main clutch 39 is greatly strengthened, and the difference limiting force is strengthened, making it possible to lock the differential rotation and, when necessary, to lock the differential rotation between the rear wheels, thereby enabling a further improvement in drivability over poor road surfaces, starting, acceleration, and stability.

With the excitation current to the electromagnet 51 controlled and an appropriate amount of slippage in the pilot clutch 33 allowed, the cam thrust force of the ball cam changes, making it possible to change the engaging force of the main clutch 39, so as to control the differential limiting force.

If this type of differential control is applied while a vehicle is turning, it is possible to greatly improve the stability of the vehicle body when cornering.

When the excitation to the electromagnet 51 is stopped, the pilot clutch 33 is released, and the cam thrust force of the ball cam is lost, so that the main clutch 39 is released, and the differential rotation is made free rotation.

Oil flows from an oil sump of the differential carrier via apertures 3g, 87, and 89 and an oil groove 3h, this oil being supplied to the meshing locations of the gears of the differential mechanism 7, the main clutch 39, the pilot clutch 33, the cam ball 57, the washer 25, the thrust bearing 61, the washer 55, the spline 59a, and the thrust washer 67, among other parts, thereby lubricating and cooling these elements.

The aperture 45 is provided on the ring 49 as an oil path at a location opposite the pilot clutch 33 and the armature 47, so that oil acting under centrifugal force discharges from this aperture 45 and urges the flow of oil past the pilot clutch 33 and the armature 47, thereby enhancing the effectiveness of lubrication and cooling of the pilot clutch 33 and lubricating the movement of the armature 47, and facilitating the engagement and release of the pilot clutch 33 (rise and fall of the difference limiting force).

The flow of drive torque distributed between the left and right rear wheels by the rear differential 1 when the vehicle turns left and right is described below, with reference made to FIG. 10 to FIG. 13.

Figure 10:
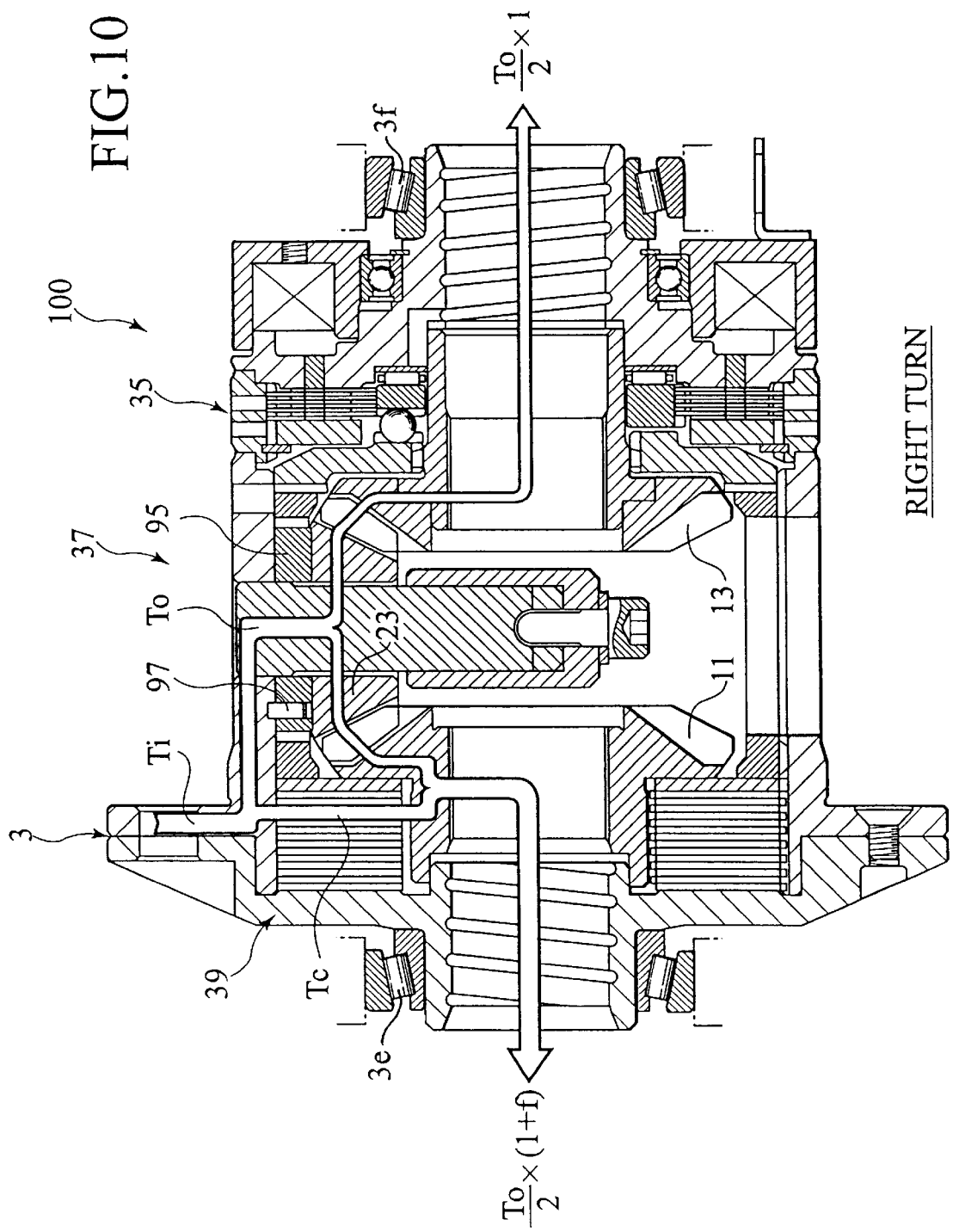
FIG. 10 is an illustration showing flow of torque distributed to a left and a right vehicle axle by a difference limiter, by the action of cam force caused by side gear meshing when a vehicle fitted with the differential apparatus of FIG. 9 makes a right turn.
Figure 11:
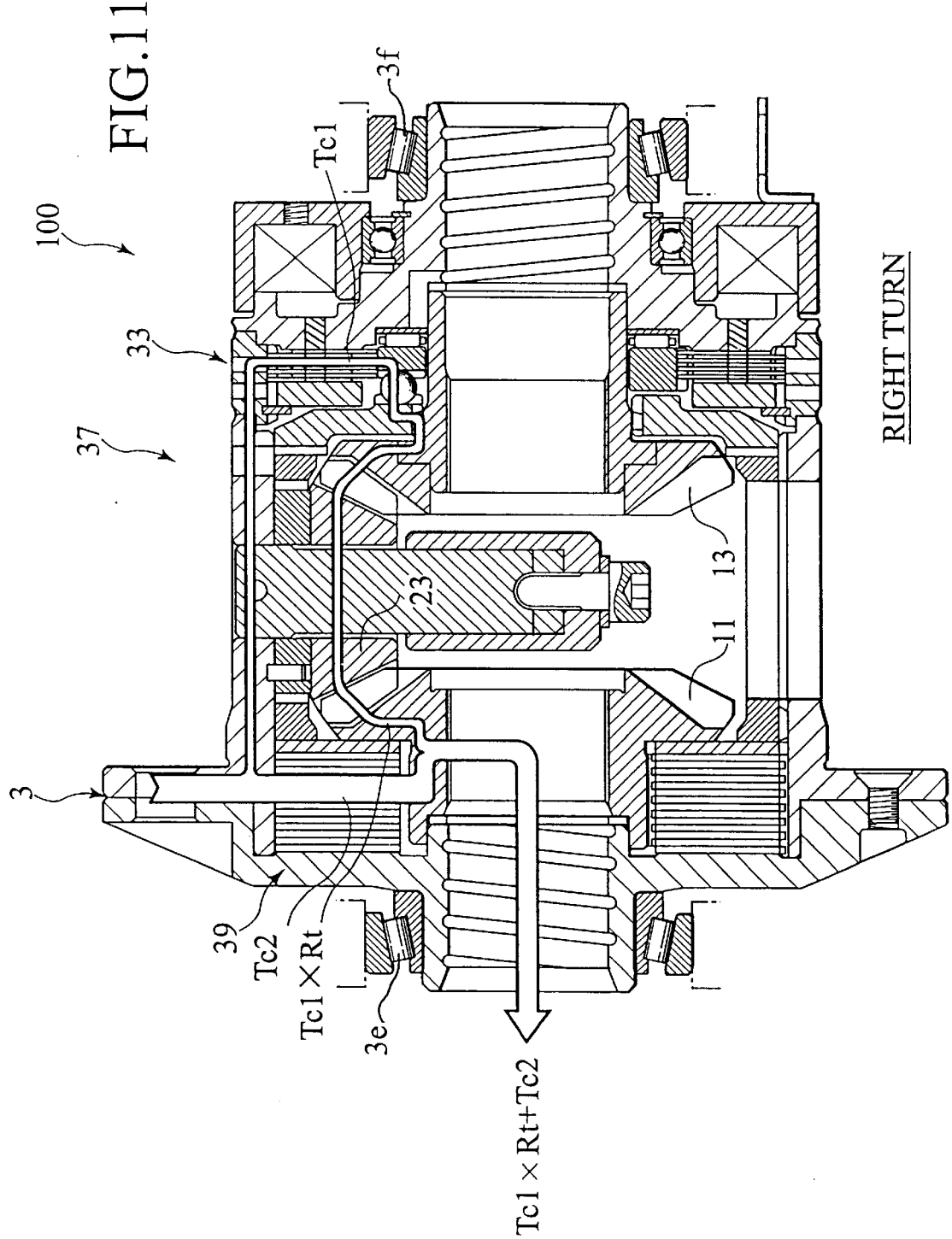
FIG. 11 is an illustration showing flow of torque distributed to a left and a right vehicle axle by a electromagnetic-type difference limiter when a vehicle fitted with the differential apparatus of FIG. 9 makes a right turn.
Figure 12:
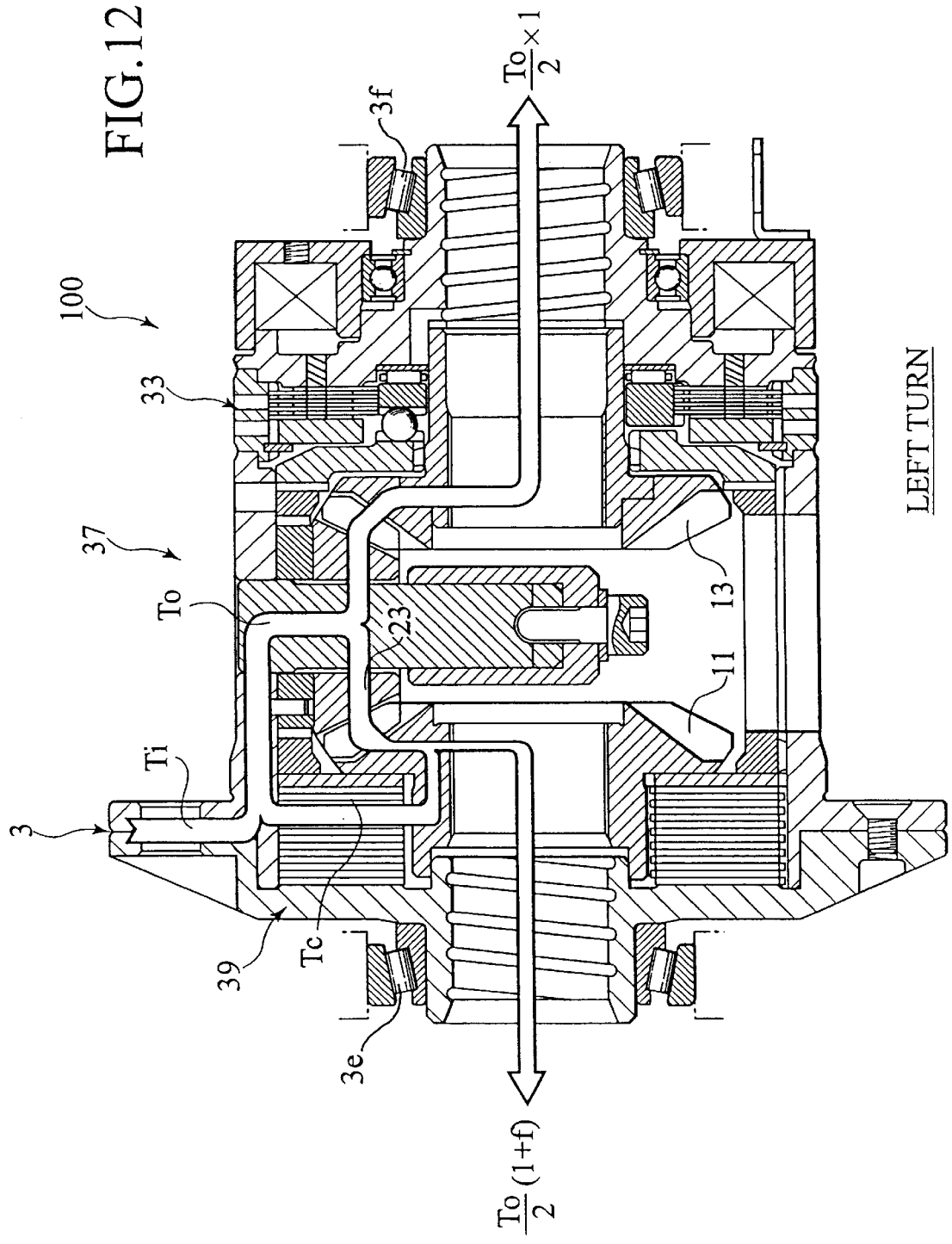
FIG. 12 is an illustration showing flow of torque distributed to a left and a right vehicle axle by difference limiter, by the action of cam force caused by side gear meshing when a vehicle fitted with the differential apparatus of FIG. 9 makes a left turn.
Figure 13:
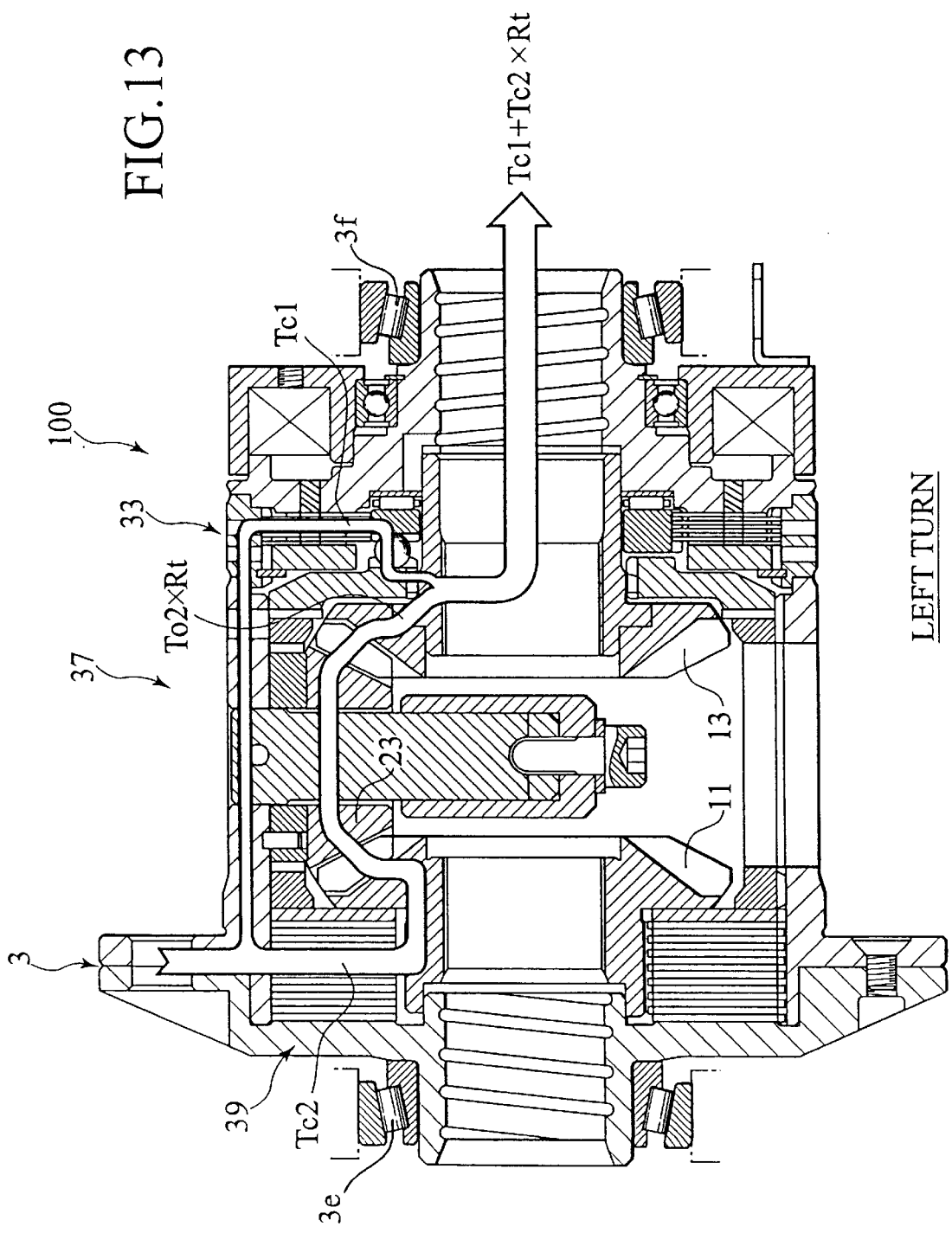
FIG. 13 is an illustration showing flow of torque distributed to a left and a right vehicle axle by a electromagnetic-type difference limiter when a vehicle fitted with the differential apparatus of FIG. 9 makes a left turn.

FIG. 10 and FIG. 11 show the torque flow when turning to the right, and FIG. 12 and FIG. 13 show the torque flow when turning left. FIG. 10 and FIG. 12 show the torque flow when the difference limiter 9 is not operating, and FIG. 11 and FIG. 13 show the torque flow when the difference limiter 9 is operating.

As shown in FIG. 10, with the configuration shown in FIG. 10 to FIG. 13, a washer 95 is used in place of the spherical washer 25 of FIG. 9, this washer 95 being fixed to the differential case 3 by a pin 97.

The definitions of symbols used in FIG. 10 to FIG. 13 and in the description to follow are as follows.

Ti: Drive torque input to the differential case 3

To: Drive torque divided equally between and transmitted to the left and right wheels from the differential case 3 via the pinion shaft 19

Tc1: Clutch torque of the pilot clutch 33 when the difference limiter 9 operates Tc2: Clutch torque of the main clutch 39 when engaged by the ball cam (41+57+59)

F: Rocking factor, given by 2×Tc/To (ratio of frictional force to the input torque)

Rt: Torque transmission coefficient, given as (1+f)/1 for right turning and 1/(1−f) for left turning Tc: Cam force due to the meshing of the left side gear 11, which is the clutch torque of the main clutch 39, expressed as (To/2)×f When the vehicle makes a right turn, the following occurs.

As shown in FIG. 10, the input torque To is equally divided by the differential mechanism 7 between the left and right rear wheels, each torque being To/2.

By the cam force of the left side gear 11 generated upon receiving torque transmitted by the differential mechanism 7, the main clutch 39 is pressed so as to generate clutch torque Tc, and when a right turn is made, because the left wheel, which is on the outside of the turn (left side gear 11) rotates ahead of the differential case 3, the torque Tc moves the left side gear 33 so as to accelerate it, this being transmitted to the left rear wheel.

Thus, a drive torque To/2 is distributed to the right rear wheel, and a torque To/2+Tc is distributed to the left rear wheel. As noted above, because Tc=f×(To/2), the torque distributed to the left rear wheel is To/2×(1+f).

Even if the difference limiter 9 is not caused to operate in this manner, the differential drive will be limited by the differential mechanism 7 according to the clutch torque Tc.

As shown in FIG. 11, with a right turn when the difference limiter 9 is caused to operate, a torque clutch Tc1 is generated at the pilot clutch 33, the pressing force of the ball cam causing a clutch torque Tc2 at the main clutch 39.

As described above, with the left rear wheel (left side gear 11) caused to rotate ahead of the differential case 3, the rotation of the right side gear 13, which rotates behind the differential case 3, is transmitted via the differential mechanism 7 so as to accelerate the left side gear 33.

Therefore, by the main clutch 39 the clutch torque Tc2 is directly sent to the left rear wheel, while at the pilot clutch 33 the clutch torque Tc1 is sent to the left rear wheel as Tc1×Rt via the differential mechanism 7, so that the sum of these, which is Tc1×Rt+Tc2 is distributed to the left rear wheel.

With an f value of 0.5, because Rt=(1+f)/1, Rt is 1.5, and the torque distributed to the left rear wheel is 1.5×Tc1+Tc2.

The clutch torques Tc1 and Tc2 limit the differential drive of the differential mechanism 7.

If the difference limiter 9 is caused to operate upon turning right, because the torque flows of FIG. 10 and FIG. 11 occur simultaneously, the sum of distributed torques in each drawing is transmitted to the left and right rear wheels, a larger torque being transmitted to the left rear wheel, on the outside of the turn, than is transmitted to the right rear wheel, thereby urging the right turn.

The case of a left turn is as follows.

As shown in FIG. 11, the input torque To is equally divided by the differential mechanism 7 between the left and right rear wheels, each torque being To/2.

Because when making a left turn the right rear wheel (right side gear 13), which is at the outside of the turn rotates ahead of the differential case 3, the clutch torque Tc generated by the cam force of the left side gear 13 returns to the differential case 3 and is added to To, causing an equal distribution to the rear wheels by the differential mechanism 7.

Thus, a torque To/2 is distributed to the right rear wheel. A torque To/2−Tc is distributed to the left rear wheel, this drive torque being To/2×(1−f), according to Tc=f×(To/2).

The clutch torque Tc limits the limits the differential drive of the differential mechanism 7.

As shown in FIG. 13, if the difference limiter 9 is caused to operate upon turning left, the clutch torque Tc1 is generated at the pilot clutch 33, and a clutch torque Tc2 occurs at the main clutch 39.

As noted above, when the right rear wheel (right side gear 13) rotates ahead of the differential case 3, the rotation of the left side gear 11, which is behind the differential case 3, is transmitted via the differential mechanism 7 so as to accelerate the right side gear 13.

Therefore, the clutch torque Tc1 is directly sent to the right rear wheel, while the clutch torque Tc2 is to the right rear wheel as Tc2×Rt via the differential mechanism 5 having a torque transmission coefficient of Rt, so that the sum of these, which is Tc1+Rt×Tc2 is distributed to the right rear wheel.

With an f value of 0.5, because Rt=1/(1−f), Rt is 2.0, and the torque distributed to the right rear wheel is Tc1+2×Tc2.

The clutch torques Tc1 and Tc2 limit the differential drive of the differential mechanism 5.

If the difference limiter 9 is caused to operate upon turning left, the torque flows of FIG. 12 and FIG. 13 occur simultaneously, the sum of the distributed torques in these drawings being transmitted to the left and right rear wheels, a larger torque being transmitted to the right rear wheel, on the outside of the turn, than is transmitted to the left rear wheel, thereby urging the left turn.

As noted above, regardless of the direction of the turn, because a larger torque is distributed to the outside rear wheel than to the inside rear wheel, there is an urging of the turn.

Because turning is improved in this manner, it is possible to improve the steering characteristics of a vehicle that tends toward under-steering.

The rear differential 100 is configured so as to bring about the above-noted effect.

As noted above, in the rear differential 100, in addition to having a differential limiting function of the difference limiter 9, the configuration is such that the cam force due to the meshing of the side gear 11 presses on the main clutch 39, and additionally such that the cam force due to the meshing of the side gear 11 and the cam thrust force of the ball cam act in the same direction.

With the bevel gear type differential mechanism 7, in which the pressure angle is the cam angle, it is possible to generate a large cam force in the side gear 11.

By virtue of the difference limiting function and the differential locking function of the main clutch 39, in which the difference limiting force is strengthened by receiving a large pressure, there is control of the difference limiting force particularly under a high load, thereby preventing spinning of the rear wheels, and enabling an improvement in vehicle startup, acceleration, and drivability and getaway ability over poor road surfaces.

By utilizing the cam force due to the meshing of the side gear 33, it is possible to strengthen the difference limiting function without the need to enlarge the electromagnet 51, the main clutch 39, the pilot clutch 33, or the ball cam or the like.

The rear differential 100, therefore, prevents an increase in size and weight, reduces the difficulty in installation in a vehicle, and prevents an increase in cost. Furthermore, there is a reduction of the load on the battery, which excites the electromagnet 51, and prevention of a drop in fuel economy of the engine.

By disposing the main clutch 39 and the ball cam on both sides of the differential mechanism 7 in the axial direction, weight and dimensional balance are achieved in the axial direction, the layout of the rear differential 100 on the chassis is facilitated, and it becomes easy to make the left and right rear axles the same length.

The differential carrier that houses the rear differential 100 need not be changed, thereby enhancing universal applicability.

The configuration of this embodiment, which uses the cam force of a side gear as a pressing force on a differential limiting clutch, is extremely effective in a differential apparatus in which an electromagnet engages a clutch without using a cam mechanism, and enables a great increase in the differential limiting force according to the electromagnet using the cam force.

A differential apparatus for a vehicle according to this embodiment has a differential mechanism for distributing drive force from an engine input to an input gear to the rear wheel side from a pair of output gears meshing therewith, a cam force due to meshing between the output gears and the input gear acting in the thrust direction of the output gears, a main clutch for difference limiting, a pilot clutch, an electromagnet for interrupting and the pilot clutch, and a cam mechanism which, when the pilot clutch is engaged, receives torque from the differential mechanism and operates, so as to engage the main clutch by means of the converted cam thrust force, wherein a cam force developed by the meshing of the output gears is input to the main clutch.

That is, when the pilot clutch is engaged by the action of the electromagnet, the differential torque of the differential mechanism is received, causing operation of the cam mechanism, the converted cam thrust force pressing the main clutch, the frictional force of which limits the difference.

By this difference limiting, spinning of a wheel on one side is limited, thereby improving startup and acceleration of the vehicle, as well as drivability and getaway over poor road surfaces.

When the magnetic force of the electromagnet is adjusted so that slippage of the pilot clutch is allowed, the cam thrust force of the cam mechanism changes, the engaging force of the main clutch changing, so as to adjust the difference limiting force.

If the difference limiting force is adjusted in this manner when turning, there is an improvement in turning performance and stability of the vehicle when turning.

When the pilot clutch is released, the cam thrust force of the cam mechanism is lost, so that the main clutch is released, thereby freeing up the differential rotation of the differential mechanism.

In addition to this, in a differential apparatus according to the present invention, the configuration is one in which the cam force developed by the meshing of the output gears with the input gear acts in the thrust directions of each output gear, this cam force pressing the main clutch, thereby strengthening the difference limiting force, so that it is possible to lock the differential operation.

The above-noted cam force is the force component in the thrust direction generated by meshing between the input gear and the output gears. With the bevel gear, the meshing force angle is the cam force direction, this force being extremely large.

By strengthening the difference limiting force in this manner, it is possible to prevent spinning of a wheel, thereby improving startup and acceleration of the vehicle, as well as drivability and getaway over poor road surfaces.

Because the cam force developed at the output gears is used as the pressure for the main clutch, so as to strengthen the difference limiting force, it is possible to prevent an increase in the size of the electromagnet, the main clutch, the cam mechanism, and the pilot clutch, for example.

Therefore, in addition to being able to prevent an increase in the size and weight of the differential apparatus and an increase in the weight and cost of the vehicle, it is possible to reduce the burden on the battery used to drive the electromagnet, thereby preventing a reduction in fuel economy of the engine.

According to this embodiment, the differential mechanism is a bevel gear type differential mechanism, with the main clutch and the cam mechanism disposed on opposite sides of the differential mechanism in the axial direction, so as to surround the differential mechanism, and a transmission member transmitting a cam thrust force converted by the cam mechanism is disposed between these elements.

In addition to the above, by using a bevel gear type of differential mechanism, and disposing a transmission member between the pinion gears thereof, the positioning of a transmission member for transmitting the cam thrust force of the cam mechanism to the main clutch disposed on the opposite side of the differential mechanism is facilitated, thereby making it possible to dispose the cam mechanism and the main clutch on opposite sides of the differential mechanism in the axial direction.

With this configuration, a cam force developed by meshing between the side gears, which are output gears, and the input gear, and a cam thrust force converted by the cam mechanism operate in one and the same direction, so that the main clutch pressure becomes large.

Therefore, in addition to further increasing the strengthening function of the difference limiter, it is possible to limit the difference limiting force under a high load (in the range in which the difference limiting force is extremely large), thereby improving the startup and acceleration of the vehicle, and improving drivability and getaway over poor road surfaces.

By disposing the constituent elements of the difference limiter on both sides of the differential mechanism in the axial direction, weight and dimensional balance are achieved in the axial direction, thereby facilitating layout of the differential apparatus on the vehicle chassis, and facilitating the achievement of axles having the same length on the left and right sides.

Additionally, because the differential carrier housing the differential apparatus need not be changed, universal application of the differential apparatus is improved.

It will be readily understood that in the present invention the differential mechanism is not restricted to a bevel gear type differential mechanism.

For example, the present invention can alternately be applied to a planetary gear type differential mechanism made up of helical gears, to a differential mechanism which is linked by a pair of helical output side gears by a helical pinion gear housed slidably within a housing hollow of a differential case, or to an arrangement, such as in a worm gear type differential mechanism, or other differential mechanism in which a cam force is developed in a side gear.

Additionally, it is not necessary for the cam to be a ball. For example, the cam can make use of a roller or other rotating element, or a cam that does not make use of a rotating element, for example, such as by use of opposing cam surfaces between a pair of members or by use of a screw structure.

In addition to the exemplary embodiment described above, in which an electromagnet is used to engage a clutch, a differential apparatus according to the present invention can use a spring to engage the pilot clutch, and an electromagnet to release the linkage of the pilot clutch.

In addition to the exemplary embodiment described above, in which the drive power from an engine is input to a differential mechanism via a differential case, the present invention can have a configuration in which a pinion shaft at the input gear side of the differential mechanism, for example, a bevel gear type differential mechanism, receives the input of the drive power from the engine.

Additionally, the differential apparatus of the present invention, in addition to a rear differential, can be front differential (a differential apparatus that distributes drive power from an engine to the left and right front wheels) or a center differential (a differential apparatus that distributes drive power from an engine to front and rear wheels).

The foregoing has been a description of the present invention using exemplary embodiments, and it will be readily understood that these embodiments do not restrict the present invention, which can take on other various forms within the spirit of or scope of the following claims.

What is claimed is:

1. A differential apparatus comprising:
   a container-shaped input member having a first supporting part and a second supporting part mutually spaced apart and joined at a container wall part;
   a first output gear and a second output gear housed within the input member;
   a main clutch as a difference limiter interposed between the first output gear and the first supporting part;
   a pilot clutch as a difference limiter interposed between the second output gear and the second supporting part, the pilot clutch being provided with an actuator for actuation thereof;
   a set of actuation members operatively linking the main and pilot clutches to each other; and
   an access path to an axle engaging part of at least one of the first and second output gears, provided through an actuation member of the set of actuation members and the container wall part of the input member.

2. A differential apparatus according to claim 1, wherein:
   the set of actuation members has a plurality of cam members connected to the actuation member.

3. A differential apparatus according to claim 1, wherein the actuation member extends along the container wall part.

4. A differential apparatus according to claim 1, comprising:
   first and second axles engaged with the first and second output gears, respectively; and
   the access path giving an access to a block member between the first and second axles.

5. A differential apparatus according to claim 4, comprising:
   a shaft member fixed to the container wall part for supporting the block member; and
   a bevel gear rotatable about the shaft member and engaged with the first and second output gears.

6. A differential apparatus according to claim 4, wherein the axle engaging part of the at least one of the first and second output gears has a stopper engaged therewith for stopping a corresponding one of the first and second axles.

7. A differential apparatus according to claim 1, wherein
   the main clutch has a first clutch element rotatable about a rotation axis together with a first actuation member of the set of actuation members,
   the pilot clutch has a second clutch element rotatable about the rotation axis together with a second actuation member of the set of actuation members, and
   the first and second clutch elements have mutually different amounts of rotational displacement, as the pilot clutch is actuated by the actuator and the main clutch is actuated by the set of actuation members.

8. A differential apparatus comprising:
   a container-shaped input member having a first supporting part and a second supporting part mutually spaced apart and joined at a container wall part;
   a first output gear and a second output gear housed within the input member;
   a main clutch as a difference limiter interposed between the first output gear and the first supporting part;
   a pilot clutch as a difference limiter interposed between the second output gear and the second supporting part, the pilot clutch being provided with an actuator for actuation thereof;
   a set of actuation members operatively linking the main and pilot clutches to each other; and
   path means for an access to an axle engaging part of at least one of the first and second output gears, provided through an actuation member of the set of actuation members and the container wall part of the input member.

9. A differential apparatus comprising:
   a differential case as an input member to be driven by drive power from an engine, to rotate about a rotation axis;
   a differential mechanism accommodated in the differential case to rotate together, the differential mechanism having first and second output gears configured to be mutually differentially rotatable about the rotation axis;
   a main clutch disposed at one side of the differential mechanism, as a difference limiter between the differential case and the first output gear case;
   a pilot clutch disposed at an opposing side to the one side of the differential mechanism, as a difference limiter between the differential case and the second output gear, the pilot clutch being operatively linked to the main clutch;
   an actuator for actuating the pilot clutch;
   a first output member inserted into the differential case, and slidably connected to the first output gear, to rotate together;
   a second output member inserted into the differential case, and slidably connected to the second output gear, to rotate together;
   a first removal preventing member to be applied between the first output gear and an inserted end of the first output member;
   a second removal preventing member to be applied between the second output gear and an inserted end of the second output member;
   a block member to be applied between the inserted end parts of the first and second output members; and
   an aperture provided in a peripheral wall of the differential case, for applying there through the first and second removal preventing members and the block member.

10. A differential apparatus according to claim 9, wherein the block member is configured to be applicable between the inserted end parts of the first and second output members after application of the first removal preventing member between the first output gear and the inserted end of the first output member and application of the second removal preventing member between the second output gear and the inserted end of the second output gear and the inserted end of the second output member.

11. a differential apparatus according to claim 9, wherein the differential mechanism has a pinion shaft fixed to the differential case, and a pinion gear rotable about the pinion shaft and meshing with the first and second output gears, and the block member is channel-shaped to fit the pinion shaft.

12. A differential apparatus comprising:
   a differential mechanism distributing drive power of an engine input to an input gear to vehicle wheels from a pair of output gears meshing therewith and in which a reaction force developed by meshing between the output gears and the input gear acts in a thrust direction of the output gears,
   a main clutch for difference limiting;
   a pilot clutch;

an electromagnet for interrupting the pilot clutch; and a cam mechanism which, with engagement of the pilot clutch, receives differential torque of the differential mechanism, operates, and uses a converted cam thrust force to cause the main clutch to engage, wherein the reaction force developed by output gear meshing is input to the main clutch.

13. A differential apparatus according to claim 12, wherein the differential mechanism comprises a bevel gear type differential mechanism, the main clutch and the cam mechanism are disposed on opposite sides in an axial direction of the differential mechanism, and a transmission member transmitting a cam thrust force converted by the cam mechanism to the main clutch is disposed between these elements.

14. A differential apparatus comprising:

a container-shaped input member having a first supporting part and a second supporting part mutually spaced apart and joined at a container wall part;

a first output gear and a second output gear housed within the input member;

a first difference limiter and a second difference limiter interposed between the first output gear and the first supporting part and between the second output gear and the second supporting part, respectively;

a solid actuation member operatively linking the first and second difference limiters to each other; and an access path to an axle engaging part of at least one of the first and second output gears, provided through the solid actuation member and the container wall part of the input member.

15. A differential apparatus comprising:

a container-shaped input member having a first supporting part and a second supporting part mutually spaced apart and joined at a container wall part;

a first output gear and a second output gear housed within the input member;

a first difference limiter and a second difference limiter interposed between the first output gear and the first supporting part and between the second output gear and the second supporting part, respectively;

an actuation member operatively linking the first and second difference limiters to each other, the actuation member defining an accommodation space for accommodating therein at least one of the first and second output gears; and an access path to the accommodation space, provided through the actuation member and the container wall part of the input member.

16. a differential apparatus comprising:

a container-shaped input member having a first supporting part and a second supporting part mutually spaced apart and joined at a container wall part;

a first output gear and a second output gear housed within the input member;

a first difference limiter and a second difference limiter interposed between the first output gear and the first supporting part and between the second output gear and the second supporting part, respectively;

an actuation member operatively linking the first and second difference limiters to each other, the actuation member defining a space needing an external service; and an external access path to the space, including an opening formed in the container wall part of the input member and an opening formed in the actuation member.

* * * * *